United States Patent [19]
Grose

[11] 3,871,403
[45] Mar. 18, 1975

[54] FUEL CONTROL VALVE

[76] Inventor: Ansel B. Grose, 8 Mount Vernon St., Stoneham, Mass. 02180

[22] Filed: Aug. 30, 1973

[21] Appl. No.: 393,038

[52] U.S. Cl.................. 137/436, 137/449, 251/80
[51] Int. Cl............................................ F16k 31/26
[58] Field of Search ............ 251/80, 118, 336, 124; 137/499, 436, 533, 17, 449, 434

[56] References Cited
UNITED STATES PATENTS

| | | | |
|---|---|---|---|
| 3,120,242 | 2/1964 | Schneider | 137/449 X |
| 3,269,406 | 8/1966 | Grose | 137/449 X |

*Primary Examiner*—Martin P. Schwadron
*Assistant Examiner*—Robert J. Miller
*Attorney, Agent, or Firm*—Aaron Tushin

[57] ABSTRACT

A fuel control valve operated by the tab of a float arm in a float chamber, having a ball valve member for opening and closing an inlet passage and an elongated plunger for operating the valve, wherein the plunger member may be made of differing lengths to accomodate different installation requirements, and wherein a spring may be incorporated in the elongated plunger to absorb vibrations and prevent erratic feeding of fuel, and wherein the plunger member may be made in reduced sizes as may be required for small installations.

4 Claims, 9 Drawing Figures ns to various installa-
tion and to prevent erratic valve operation.

FUEL CONTROL VALVE

FIELD OF THE INVENTION

Fuel control valves especially for use with carburetors, wherein the valve is controlled by a float in the float chamber of the carburetor, and the parts are so related as to permit accommodation to various installations and to prevent erratic valve operation.

DESCRIPTION OF THE PRIOR ART

This invention constitutes an important improvement in the float operated valve structure shown in my prior U.S. Pat. No. 3,424,431, filed Jan. 28, 1969. In this patented valve structure fuel is supplied from the usual fuel pump to pass through a float operated back check valve into a float chamber containing a pool of liquid fuel. A small ball is used for the check valve and a second larger plunger ball is used to open and close the small ball check valve. A generally conical surface provides a chamber surrounding the small ball valve member, and this chamber merges into a larger cylindrical chamber surrounding the larger plunger ball. The outward movement of the plunger ball is limited by an inwardly turned circular lip or flange. Radial openings are provided around the large plunger ball for passage of the fuel as it is admitted to the float chamber.

It has been found that this prior art construction cannot be used in some commercial carburetors. This is because the plunger is in the shape of a ball and must be generally of a uniform diameter. This does not permit of any substantial variations in the length of the ball valve operating linkage. Such variations, however, would be necessary to accomodate the valve to the many different present day commercial carburetors.

Another difficulty has been experienced with the prior art valve when it is used on present day vehicles with flexibly mounted motors which will vibrate while running. This vibration will cause the ball valve to seat unsteadily. This may cause overfilling of the float chamber with resulting wastage of fuel and possible air pollution, due to improper resulting fuel-air mixture.

SUMMARY OF THE INVENTION

It will be seen from the following description that the present invention has been directed to the improvement of the adaptability and operation of the prior art valve by so constructing and forming certain parts of the valve to overcome the difficulties pointed out above.

This is accomplished by a special design and formation of the new type of plunger valve operating member which is used in place of the ball plunger member of the prior art valve.

The new plunger member, in a first embodiment, has been made in an elongated form instead of in ball form. This permits the use of plunger members of different lengths to accomodate different installation requirements. The top of the plunger has been made in semi-spherical form so that the incoming flow of fuel is the same as when the ball plunger is used. This is important because the washing and flushing action of the fuel is maintained in the same manner as with the ball plunger.

In a modified form, the elongated plunger is made with a housing part and a plunger part. Within the housing is a spring urging the plunger outwardly to a limited position. This spring acts to absorb vibrations, particularly when the ball valve member is in closed position. With this arrangement, any vibrations of a flexibly mountd engine on which this carburator valve may be used, will be absorbed so that they will not cause intermittant unseating of the valve, which would result in unsteady engine performance, wastage of fuel, and air pollution.

DESCRIPTION OF THE INVENTION

Figure 1:
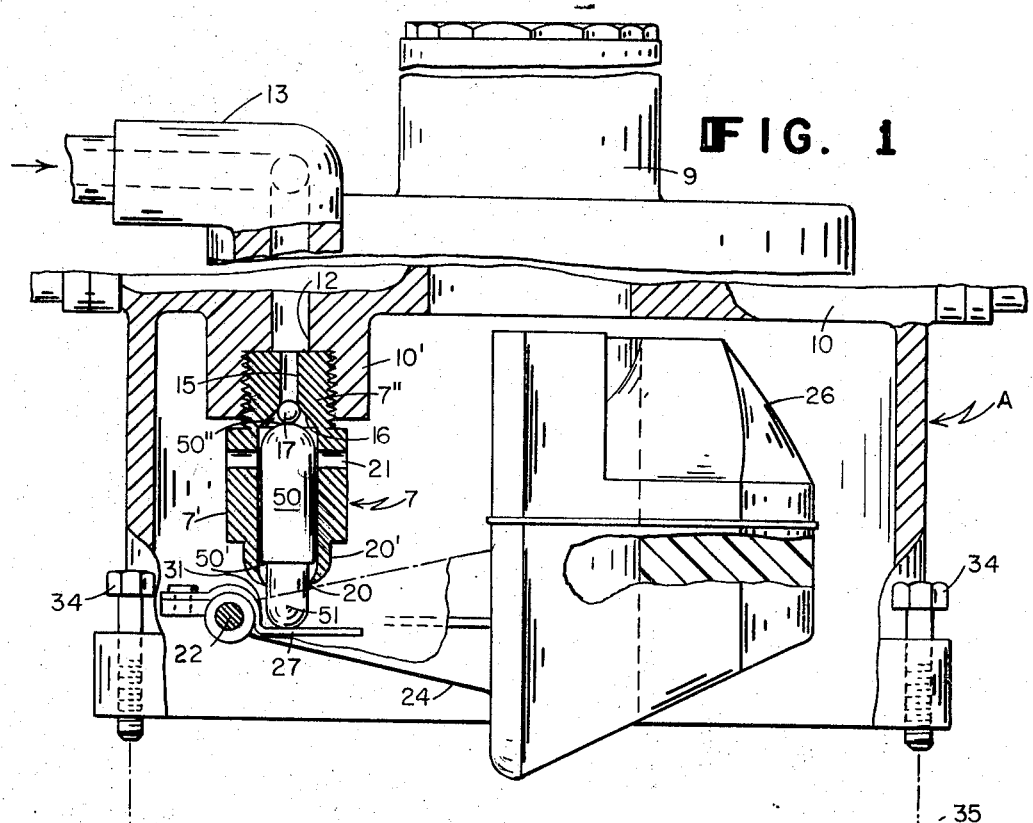
FIG. 1 illustrates an embodiment of the invention installed in one type of commercial carburetor wherein parts of the carburetor are shown in exploded relation, and significant parts of the valve and carburetor are shown in cross section.
Figure 2:
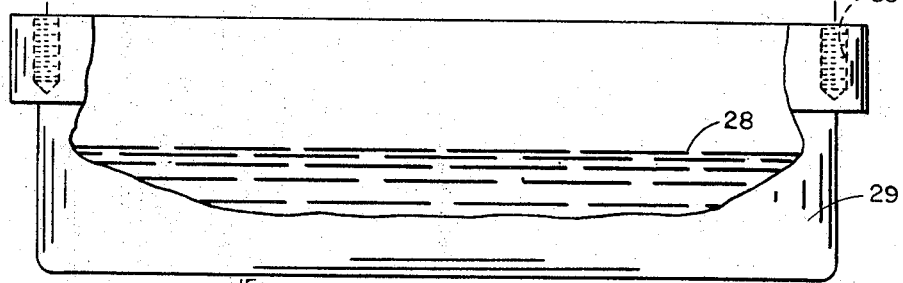
FIG. 2 is a fragmentary partial sectional view of the valve construction illustrated in FIG. 1 showing it in open position, and in assembled relation with the float and its associated parts.
Figure 2:
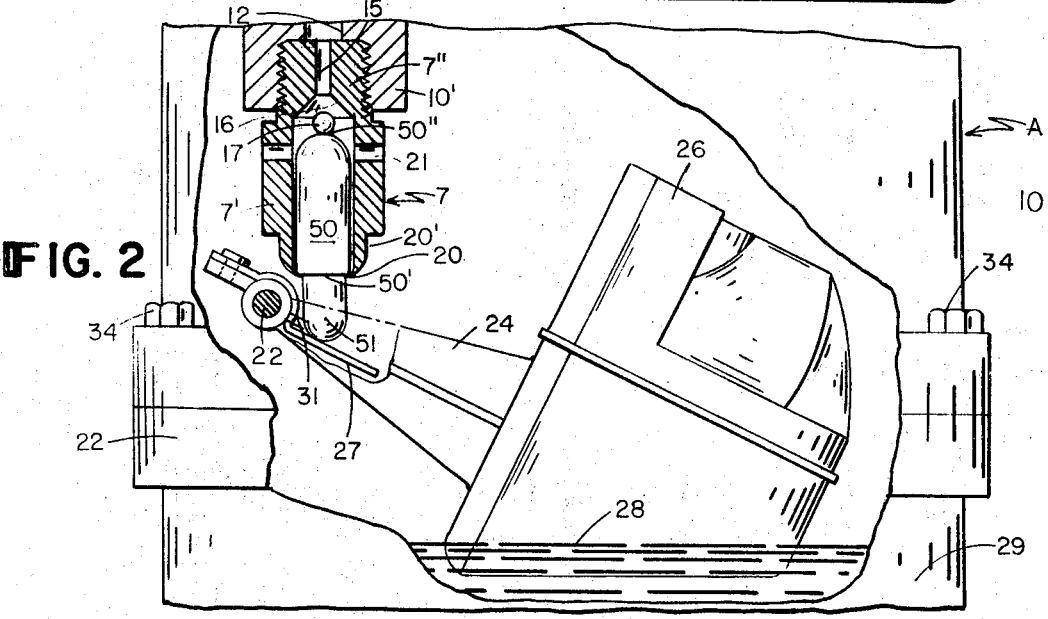
Figure 3:
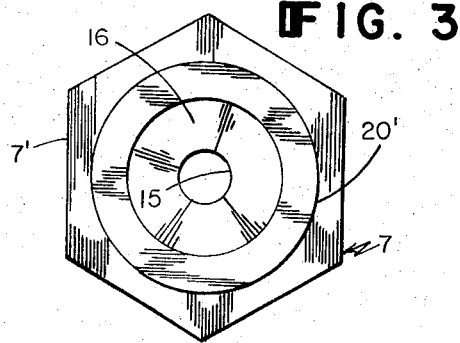
FIG. 3 is a bottom plan view of the valve body with the moving valve parts omitted, and before an inwardly turned lip has been formed.
Figure 4:
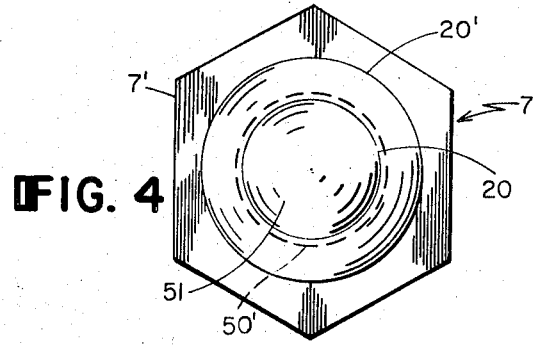
FIG. 4 is a bottom plan view of the valve body, similar to FIG. 3, but showing the plunger valve operating member in place and an inwardly turned lip formed for retaining the plunger.
Figure 6:
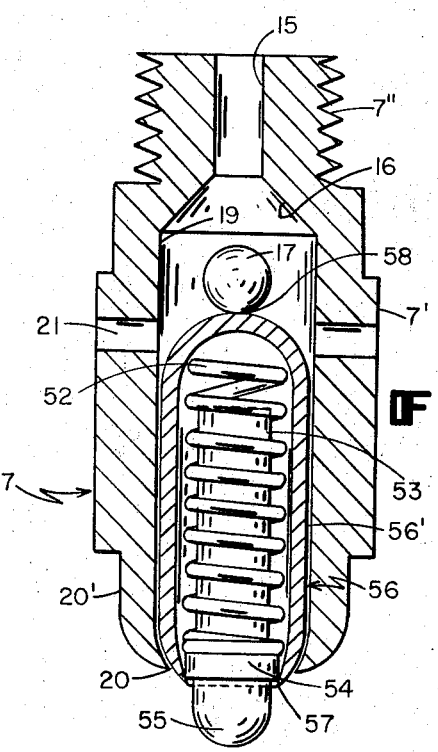
FIG. 6 is a vertical sectional view of a modified valve structure showing an elongated operating plunger having a vibration absorbing spring incorporated therein.
Figure 5:
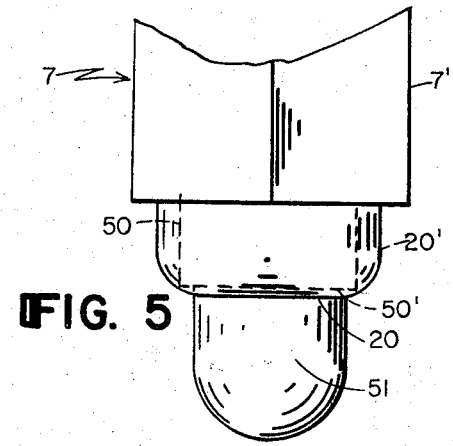
FIG. 5 is an elevation of a fragmentary part of the valve body and operating plunger.
Figure 7:
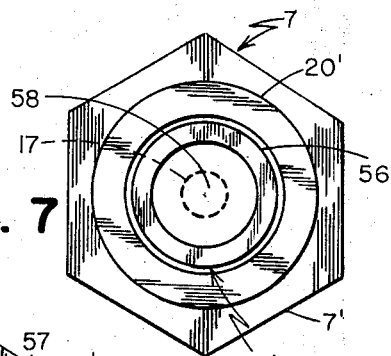
FIG. 7 is a bottom plan view of the valve of FIG. 6 without the modified plunger in place, but before inwardly turned lips have been formed to limit movement of the parts.
Figure 9:
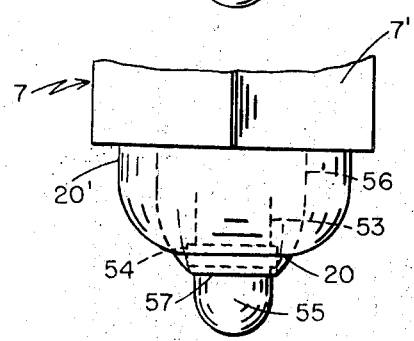
FIG. 9 is an elevation of a fragmentary part of the valve body and operating plunger.
Figure 8:
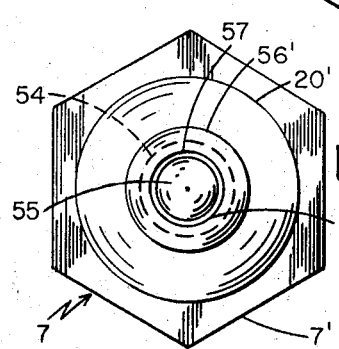
FIG. 8 is a bottom plan view similar to FIG. 7 but showing inwardly turned retaining lips formed on the valve body and plunger parts.

Referring to the invention as illustrated in the drawings, and in particular to the embodiment shown in FIGS. 1 to 5, the valve 7 is shown installed in a commercial type of carburetor A having a fuel inlet tube 13 through which fuel is supplied under pressure, an upper housing portion 9, an upper float chamber portion 10 and a lower float chamber portion 29. During normal operation, a pool of fuel 28 will be present in the float chamber. In final assembly, the float chamber portion 29, shown separated in FIG. 1, will be bolted to the upper float chamber portion 10 by bolts 34 extending into threaded holes 35 (See FIG. 2).

The valve 7 is provided with an externally hexagonal valve body member 7' having a threaded boss 7'' extending into a fuel inlet duct 12 from inlet tube 13. A central longitudinal passage is provided through the valve body 7, comprising an inlet portion 15, a generally conical portion 16 and a larger diameter portion 19. Extending from the man body portion 7' is an extension portion 20' of reduced size, terminating in a turned in flange 20 which provides a stop for the elongated plunger 50.

Located in the conical valve passage portion 16 is a small ball valve member 17. In closed position this ball valve member seats against the end of the small valve passage 15 to close the passage, the ball valve member being slightly larger than passage 15.

Located in the valve body 7' in engagement with ball 17 is an elongated valve operating plunger member 50, having a lower portion 51 of reduced diameter, thus forming a shoulder portion 50'. The travel of the plunger member 50 in passage portion 19 is limited by the turned in flange 20, which will engage the shoulder portion 50' to limit its downward movement. Radial passages 21 are provided in valve body 7' for passage of fuel past valve member 17 into the float chamber 29 when the valve member 7 is unseated.

The carburator A contains the conventional float 26 connected to arm 24 pivoted on pivot pin 22. A tab 27 having a curved portion 31 extending around pin 22, is secured to arm 24 in position to engage the valve operating plunger portion 51.

In operation, fuel under pressure from inlet tube 13 enters passage 12 and passage 15, washes and flushes over ball 17 and the upper spherical end of plunger 50, and passes outwardly through passages 21 to the float chamber 29. During this time the float 26 is in a lowered position, due to gravity, and the ball 17 and plunger 50 are in a lowered position shown in FIG. 2. As the float chamber fills with fuel, the float 26 is raised until the ball 17 is seated against the circular end of passage 15 by pressure exerted through tab 27, plunger member 50 and ball 17. A slight drop in fuel level will lower float 26, thus lowering valve ball 17 and permitting fuel to flow past ball 17, along conical portion 16 and out through passages 21.

It will be seen that this design is readily adaptable to use with carburators of greatly varying design and dimensions, since the plunger member 50 can be made in whatever length the particular installation may require. With the ball plunger member of the prior art described above, this is not possible. Further, the plunger 50 may be formed with as small a diameter as may be desired or required for very small installations.

The modified form of valve structure shown in FIGS. 6 to 9 is similar to that shown in FIGS. 1 to 5, but is provided with a modified and improved plunger member 56. The plunger member comprises a housing 56', spring 52 and a plunger part 55 having a stem 53 projecting into the spring, and a flange 54 providing on its upper surface a shoulder portion engaging the spring 52, and on its lower surface an abutment portion for engaging a turned-in portion 57 of housing 56'. The housing 56' is turned inwardly at its lower end at 57 to engage the lower abutment portion of flange 54 and thus provide a stop for limiting outward movement of the plunger part 55.

In operation, when the valve is in the closed position shown in FIG. 1, vibrations and shocks which may occur due to the running of the engine or any other device on which the valve is used, are dampened and absorbed by the yielding action of spring 52. This prevents the transmission of shocks to the valve ball 17. Thus a steady and uninterrupted seating of the valve is obtained.

Although specific embodiments of the invention have been illustrated, it is to be understood that various changes may be made without departing from the spirit of the invention.

Having described my invention, I claim:

1. A fuel control valve comprising a main body portion, an upper passageway in the main body portion, a generally conical passageway in the main body portion having a small end and a large end, and having its small end merging with the upper passageway, an enlarged passage merging with the large end of the conical passageway and extending downwardly through the main body portion, a plunger in said enlarged passage, said body portion having an inwardly turned portion at its lower end positioned to engage the plunger for limiting its outward movement, said plunger comprising an elongated housing open at the lower end and closed at the upper end, a turned-in portion of reduced diameter at the lower open end, a plunger part within the housing having a flange adjacent one end, providing a shoulder portion on the upper flange portion and abutment portion on the lower flange portion, a stem extending upwardly from the shoulder portion, a spring surrounding the stem and engaging the upper shoulder portion of the flange at one end and the closed upper end of the housing at the other end, the turned-in portion of the housing being arranged to engage the lower abutment portion of the plunger flange to limit the outward movement thereof.

2. A fuel control valve as recited in claim 1, wherein the upper end of the plunger is of spherical shape.

3. A fuel control valve as recited in claim 2, wherein radial outlet passages are provided in the housing adjacent the spherical upper end of the plunger.

4. A fuel control valve as recited in claim 1, wherein a ball valve member is inserted between the closed upper end of the plunger housing and the upper passageway in the main body portion.

* * * * *